United States Patent
Mir et al.

(10) Patent No.: US 6,851,325 B2
(45) Date of Patent: Feb. 8, 2005

(54) DSP BASED ALGORITHM FOR NON-CONTACTING TORQUE SENSOR

(75) Inventors: Sayeed A. Mir, Saginaw, MI (US); Mohammad S. Islam, Saginaw, MI (US); Tomy Sebastian, Saginaw, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/320,328

(22) Filed: Dec. 16, 2002

(65) Prior Publication Data

US 2004/0112147 A1 Jun. 17, 2004

(51) Int. Cl.$^7$ ................................................ G01L 3/02
(52) U.S. Cl. ........................... 73/862.335; 73/862.326; 73/862.328; 73/862.331
(58) Field of Search ..................... 73/862.321–862.339, 73/862.31

(56) References Cited

U.S. PATENT DOCUMENTS

| | | | |
|---|---|---|---|
| 4,724,710 A | | 2/1988 | Murty ...................... 73/862.33 |
| 5,450,761 A | * | 9/1995 | Zilberman et al. ..... 73/862.329 |
| 5,497,667 A | * | 3/1996 | Nakaura ................ 73/862.328 |
| 5,739,616 A | * | 4/1998 | Chikaraishi et al. ........ 310/194 |
| 5,811,695 A | | 9/1998 | Satoh et al. ........... 73/862.331 |
| 6,035,960 A | * | 3/2000 | Wakao et al. ................ 180/446 |
| 6,362,586 B1 | | 3/2002 | Naidu |
| 6,370,967 B1 | * | 4/2002 | Kouketsu et al. ....... 73/862.333 |
| 6,400,142 B1 | | 6/2002 | Schroeder |
| 6,424,896 B1 | | 7/2002 | Lin et al. |
| 6,481,296 B2 | * | 11/2002 | Jin et al. ................ 73/862.331 |
| 6,481,297 B2 | * | 11/2002 | Kim et al. .............. 73/862.331 |
| 6,581,497 B1 | * | 6/2003 | Kelton ........................ 81/3.32 |
| 6,622,576 B1 | * | 9/2003 | Nakano et al. ......... 73/862.331 |
| 6,711,970 B2 | * | 3/2004 | Matsuura et al. ....... 73/862.328 |

OTHER PUBLICATIONS

U.S. Appl. No. 10/319,952, filed Dec. 16, 2002, Islam et al.
Koyo Engineering Journal English Edition No. 160E; Development Of Custom IC for EPS Torque Sensor; Author: K. Yoshida; pp. 48–51; 2002.

* cited by examiner

Primary Examiner—Edward Lefkowitz
Assistant Examiner—Alandra Ellington
(74) Attorney, Agent, or Firm—Michael D. Smith

(57) ABSTRACT

A method of detecting a sensed parameter for a motor control system comprising: receiving a sensor signal, the sensor signal exhibiting a frequency responsive to an inductance of a non-contacting variable reluctance rotational displacement sensor, wherein the inductance is indicative of a displacement of the sensor and responsive to the sensed parameter; capturing a first transition of the sensor signal and a time associated therewith; capturing a second transition of the sensor signal and a time associated therewith; calculating a period for the sensor signal; and computing a value for the sensed parameter, the value responsive to the period.

26 Claims, 4 Drawing Sheets

DSP BASED ALGORITHM FOR NON-CONTACTING TORQUE SENSOR

BACKGROUND

This invention relates to non-contacting torque sensor and an algorithm for processing signals therefrom. Currently, many of the non-contacting torque sensors employ a permanent magnet in the structure. Others utilize eddy current principles to determine the torque.

It is well known in the torque sensing art that the deformation, or twist, of a rotary shaft under load can be sensed as a measure of the torque being transmitted through the shaft. In relatively low torque applications where the amount of twist may be too small for accurate measurement, such as in automotive power steering systems, the twist is typically augmented by inserting a torsion bar between two relatively rigid sections of the shaft. The relative rotation of the more rigid sections of the shaft may be mechanically or electrically detected using a variety of techniques.

Ideally, a torque sensing arrangement should have the following characteristics. The sensor, if electrical or electromagnetic, should have a stationary transducer element, avoiding the need for slip rings or other rotating or sliding contact arrangements. This is true even in limited rotation applications, such as in automotive steering, since movement of the electrical cables increases the likelihood of failures due to mechanical fatigue or interference. The sensor should be non-contacting, meaning that the sensor elements do not physically contact each other in normal operation. Contacting operation invariably introduces hysteresis error and the possibility of failure due to mechanical bind-up. The sensor should be amenable to mass production, with liberal tolerances on the parts. The sensor should be reasonably easy to calibrate in mass production. And finally, the sensor should be capable of redundant torque measurement to permit continued operation in the event of a transducer failure.

Therefore, it would be beneficial to provide a non-contacting torque sensor that inductance variation of a coil due to the change in reluctance in a magnetic circuit when the torsion bar is under torque.

BRIEF SUMMARY

Disclosed herein is a method of detecting a sensed parameter for a motor control system comprising: receiving a sensor signal, the sensor signal exhibiting a frequency responsive to an inductance of a non-contacting variable reluctance rotational displacement sensor, wherein the inductance is indicative of a displacement of the sensor and responsive to the sensed parameter; capturing a first transition of the sensor signal and a time associated therewith; capturing a second transition of the sensor signal and a time associated therewith; calculating a period for the sensor signal; and computing a value for the sensed parameter, the value responsive to the period.

Also disclosed herein is a system for measuring a sensor parameter for a motor control system in a vehicle steering system comprising: a parameter sensor generating and transmitting a sensor signal indicative of a sensed parameter; a controller operatively coupled to the parameter sensor. The controller executes a method for: receiving a sensor signal, the sensor signal exhibiting a frequency responsive to an inductance of a non-contacting variable reluctance rotational displacement sensor, wherein the inductance is indicative of a displacement of the sensor and responsive to the sensed parameter. The method also includes: capturing a first transition of the sensor signal and a time associated therewith; capturing a second transition of the sensor signal and a time associated therewith; calculating a period for the sensor signal; and computing a value for the sensed parameter, the value responsive to the period.

Further disclosed herein is a steering system with a parameter sensor comprising: a steerable wheel coupled to a motor; a parameter sensor generating and transmitting a sensor signal indicative of a sensed parameter; a controller operatively coupled to the motor and the parameter sensor; the controller generating command to direct the motor. The parameter sensor comprises: an annular sleeve; a coil coaxially aligned within the sleeve; a first ring in magnetic communication with the sleeve, coaxially aligned and configured to rotate relative to the sleeve, the first ring including a first plurality of axially directed teeth arranged substantially equidistant about a circumference of the ring on a front portion thereof; a second ring in magnetic communication with the first ring and the sleeve, the second ring coaxially aligned and configured to rotate relative to the first ring and the sleeve and including a second plurality of axially directed teeth configured substantially the same as the first plurality of axially directed teeth and oriented adjacent to the first plurality of axially directed teeth on a rear portion of the second ring; and wherein the coil generates a signal responsive to a differential rotational displacement between the first ring and the second ring.

In yet another embodiment disclosed herein is a system for measuring a sensor parameter for a motor control system in a vehicle steering system comprising: a means for receiving a sensor signal, the sensor signal exhibiting a frequency responsive to an inductance of a non-contacting variable reluctance rotational displacement sensor, wherein the inductance is indicative of a displacement of the sensor and responsive to the sensed parameter; a means for capturing a first transition of the sensor signal and a time associated therewith; a means for capturing a second transition of the sensor signal and a time associated therewith; a means for calculating a period for the sensor signal; and a means for computing a value for the sensed parameter, the value responsive to the period.

Also disclosed herein is a storage medium encoded with a machine-readable computer program code, said storage medium including instructions for causing controller to implement the abovementioned method for detecting a sensed parameter for a motor control system.

Also disclosed herein is a computer data signal, said computer data signal comprising code configured to cause a controller to implement the abovementioned method for detecting a sensed parameter for a motor control system.

BRIEF DESCRIPTION OF THE DRAWINGS

The present invention will now be described, by way of an example, with references to the accompanying drawings, wherein like elements are numbered alike in the several figures in which.

DESCRIPTION OF AN EXEMPLARY EMBODIMENT

Figure 1:
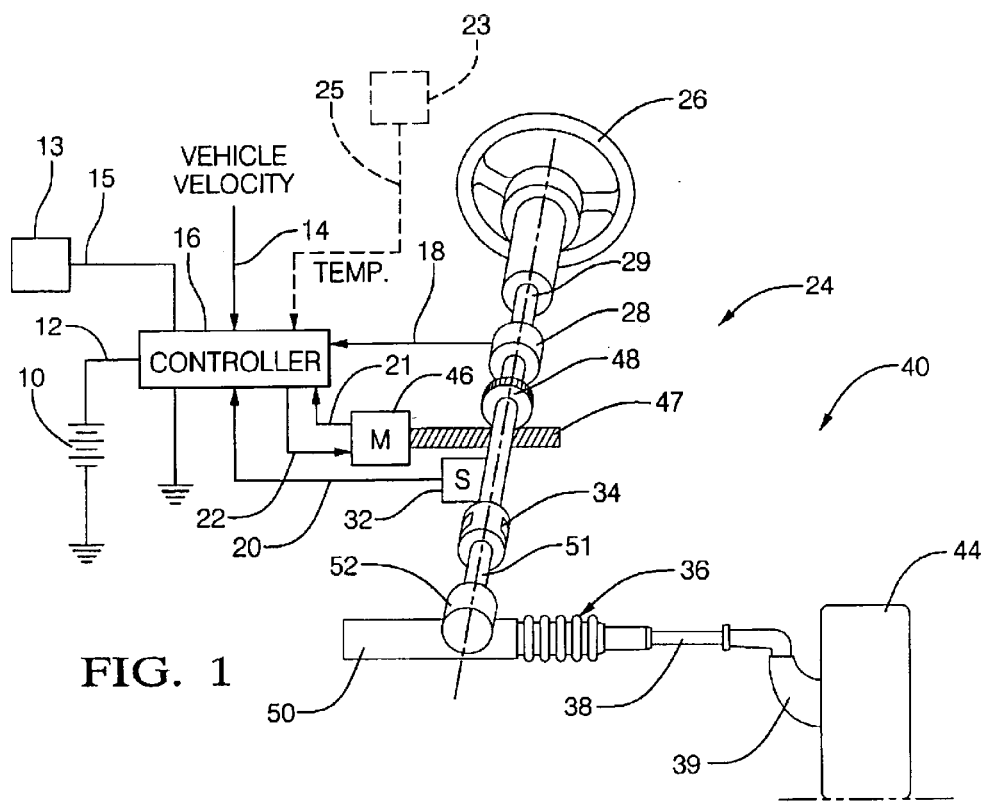
FIG. 1 depicts an electric power steering system employing an exemplary embodiment.

Referring to FIG. 1, reference numeral 40 generally designates a motor vehicle electric power steering system suitable for implementation of the disclosed embodiments. The steering mechanism 36 is a rack-and-pinion type system and includes a toothed rack (not shown) within housing 50 and a pinion gear (also not shown) located under gear housing 52. As the operator input, hereinafter denoted as a steering wheel 26 (e.g. a hand wheel and the like) is turned, the upper steering shaft 29 turns and the lower steering shaft 51, connected to the upper steering shaft 29 through universal joint 34, turns the pinion gear. Rotation of the pinion gear moves the rack, which moves tie rods 38 (only one shown) in turn moving the steering knuckles 39 (only one shown), which turn a steerable wheel(s) 44 (only one shown).

Electric power steering assist is provided through the control apparatus generally designated by reference numeral 24 and includes the controller 16 and the electric motor 46. The controller 16 is powered by the vehicle power supply 10 through line 12. The controller 16 receives a vehicle speed signal 14 representative of the vehicle velocity. Steering pinion gear angle is measured through position sensor 32, which may be an optical encoding type sensor, variable resistance type sensor, or any other suitable type of position sensor, and supplies to the controller 16 a position signal 20. Motor velocity may be measured with a tachometer and transmitted to controller 16 as a motor velocity signal 21. A motor velocity denoted $\omega_m$ may be measured, calculated or a combination thereof. For example, the motor velocity $\omega_m$ may be calculated as the change of the motor position $\theta$ as measured by a position sensor 32 over a prescribed time interval. For example, motor speed $\omega_m$ may be determined as the derivative of the motor position $\theta$ from the equation $\omega_m = \Delta\theta/\Delta t$ where $\Delta t$ is the sampling time and $\Delta\theta$ is the change in position during the sampling interval. Alternatively, motor velocity may be derived from motor position as the time rate of change of position. It will be appreciated that there are numerous well-known methodologies for performing the function of a derivative.

As the steering wheel 26 is turned, torque sensor 28 senses the torque applied to the steering wheel 26 by the vehicle operator. The torque sensor 28 may include a torsion bar (not shown) and a variable resistive-type sensor (also not shown), which outputs a variable torque signal 18 to controller 16 in relation to the amount of twist on the torsion bar. Although this is the preferable torque sensor, any other suitable torque-sensing device used with known signal processing techniques will suffice. In response to the various inputs, the controller sends a command 22 to the electric motor 46, which supplies torque assist to the steering system through worm 47 and worm gear 48, providing torque assist to the vehicle steering.

It should be noted that although the disclosed embodiments are described by way of reference to motor control for electric steering applications, it will be appreciated that such references are illustrative only and the disclosed embodiments may be applied to any instance where rotational displacement, e.g., torque sensing is desired. Moreover, the references and descriptions herein may apply to many forms of parameter sensors, including, but not limited to torque, position, speed and the like. It should also be noted that reference herein to electric machines including, but not limited to, motors, or more specifically sinusoidally excited brushless DC motors, hereafter, for brevity and simplicity, reference will be made to motors only without limitation.

In the control system 24 as depicted, the controller 16 utilizes the torque, position, and speed, and like, to compute a command(s) to deliver the required output power. Controller 16 is disposed in communication with the various systems and sensors of the motor control system. Controller 16 receives signals from each of the system sensors, quantifies the received information, and provides an output command signal(s) in response thereto, in this instance, for example, to the motor 46. Controller 16 is configured to develop the necessary voltage(s) out of inverter (not shown) such that, when applied to the motor 46, the desired torque or position is generated. Because these voltages are related to the position and speed of the motor 46 and the desired torque, the position and/or speed of the rotor and the torque applied by an operator are determined. A position encoder is connected to the steering shaft 51 to detect the angular position $\theta$. The encoder may sense the rotary position based on optical detection, magnetic field variations, or other methodologies. Typical position sensors include potentiometers, resolvers, synchros, encoders, and the like, as well as combinations comprising at least one of the forgoing. The position encoder outputs a position signal 20 indicating the angular position of the steering shaft 51 and thereby, that of the motor 46.

Desired torque may be determined by one or more torque sensors 28 transmitting torque signals 18 indicative of an applied torque. An exemplary embodiment includes such a torque sensor 28 and the torque signal(s) 18 therefrom, as may be responsive to a compliant torsion bar, T-bar, spring, or similar apparatus (not shown) configured to provide a response indicative of the torque applied. In an exemplary embodiment, a non-contacting torque sensor is disclosed employs the inductance variation of a coil due to a change in reluctance in a magnetic circuit when the torsion bar is experiencing torque.

Figure 2:
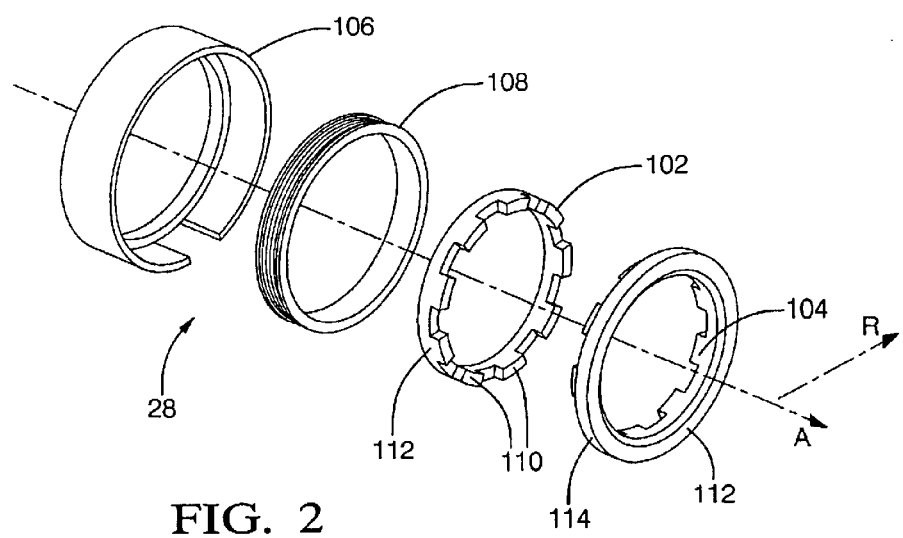
FIG. 2 is diagram depicting torque sensor in accordance with an exemplary embodiment.

Referring now to FIG. 2 as well, the torque sensor 28 transmits torque signal(s) 18 to controller 16 for processing in accordance with another exemplary embodiment. Controller 16 executes a digital signal processing (DSP) algorithm 200 is employed for processing the torque signal(s) for the non-contacting torque sensor 28. In an exemplary embodiment, the variable inductance information of a non-contacting torque sensor is encoded into a time-period of square wave oscillation. Preferably, the sensing electronics is configured integral with the torque sensor 28 or controller 16 of the EPS system 40. Advantageously, this approach further reduces cost and simplifies the interface electronics. The algorithm 200 depends on the frequency signal output from an oscillator circuit 120. The torque sensor 28 forms an element of the oscillator circuit 120. In an exemplary embodiment, the period of the oscillation is proportional to the inductance of the torque sensor 28. Hence, as the torque varies, the inductance of the torque sensor 28 shifts resulting in a variation of the inductance. Thus, the torque information is embedded in the frequency or period of the oscillation, which may readily be observed and measured.

Optionally, a temperature sensor(s) 23 located at the torque sensor 28. Preferably the temperature sensor 23 is configured to directly measure the temperature of the sensing portion of the torque sensor 28. The temperature sensor 23 transmits a temperature signal 25 to the controller 16 to facilitate the processing prescribed herein and compensation. Typical temperature sensors include thermocouples, thermistors, thermostats, and the like, as well as combinations comprising at least one of the foregoing sensors, which when appropriately placed provide a calibratable signal proportional to the particular temperature.

The position signal 20, velocity signal 21, and a torque signal(s) 18 among others, are applied to the controller 16. The controller 16 processes all input signals to generate values corresponding to each of the signals resulting in a rotor position value, a motor speed value, and a torque value being available for the processing in the algorithms as prescribed herein. Measurement signals, such as the above-mentioned are also commonly linearized, compensated, and filtered as desired or necessary to enhance the characteristics or eliminate undesirable characteristics of the acquired signal. For example, the signals may be linearized to improve processing speed, or to address a large dynamic range of the signal. In addition, frequency or time based compensation and filtering may be employed to eliminate noise or avoid undesirable spectral characteristics.

In order to perform the prescribed functions and desired processing, as well as the computations therefore (e.g., the torque sensor signal processing, control algorithm(s), and the like), controller 16 may include, but not be limited to, a processor(s), computer(s), DSP(s), memory, storage, register(s), timing, interrupt(s), communication interface(s), and input/output signal interfaces, and the like, as well as combinations comprising at least one of the foregoing. For example, controller 16 may include input signal processing and filtering to enable accurate sampling and conversion or acquisitions of such signals from communications interfaces. Additional features of controller 16 and certain processes therein are thoroughly discussed at a later point herein.

As exemplified herein and disclosed above one such process may be determining a torque value from torque signal(s) 18. Controller 16 receives various input signals including, but not limited to, those identified above, to facilitate such processing and may provide one or more output signals in response. Once again, it will be appreciated that while the embodiment disclosed herein is explained by way of discussion concerning torque signals and torque sensors, other sensors and sensed parameters may be equally applicable.

In an exemplary embodiment, the controller 16 obtains as input signals or receives signals to facilitate computing, among others, a torque signal 18, from a torque sensor 28. The torque signal 18 is representative of the torque felt/applied by an operator of the vehicle or they may be combined in series to achieve a larger magnitude signal. Also received by the controller 16 are a variety of implementation specific parameters, signals and values for initialization and characterization of the prescribed processes and to identify various states of the processes herein.

Continuing now with FIG. 2, there is depicted an expanded view of an exemplary embodiment of a non-contacting torque sensor 28. The electromagnetic structure of the torque sensor 28 comprises a ring shaped upper toothed-structure (UTS) hereinafter denoted UTS 102, a ring shaped lower toothed-structure (LTS) hereinafter denoted LTS 104, a sleeve 106 and coil/bobbin assembly hereinafter denoted coil 108. The UTS 102, LTS 104, sleeve 106 and coil 108 are assembled and installed in the steering system 40 by means of some mechanical members configured to position the UTS 102 and LTS 104 as rotating members while the sleeve 106 and coil 108 are stationary.

The operation of the torque sensor 28 is based on the reluctance variation of the magnetic circuit when there is a relative rotation between UTS 102 and LTS 104. The reluctance is an embedded element in the inductance of the coil 108, which can be encoded into a measurable electrical quantity such as a voltage, time-period, and the like. The UTS 102 and LTS 104 are attached to the upper steering shaft 29 and lower steering shaft 51, respectively, of the steering system 40. The two assemblies of the steering system 40 are linked by the torsion bar or similar torque responsive apparatus (not shown). When the torque is applied (for example, at the steering wheel 26, the compliance of the torsion bar provides a relative circumferential shift between the UTS 102 and LTS 104, which varies the overlapping area between the UTS 102 and LTS 104, hence the reluctance of the magnetic circuit or the inductance of the coil 108 varies. Thus, it will be appreciated that the inductance of the coil 108 facilitates an encoding circumferential displacement of the UTS 102 and LTS 104, and thereby an encoding of the torque information as applied on the upper steering shaft 29 relative to the lower steering shaft 51. Similarly, the applied torque (e.g., at steering wheel 26) is converted to an angle by means of the same torsion bar.

Figure 3:
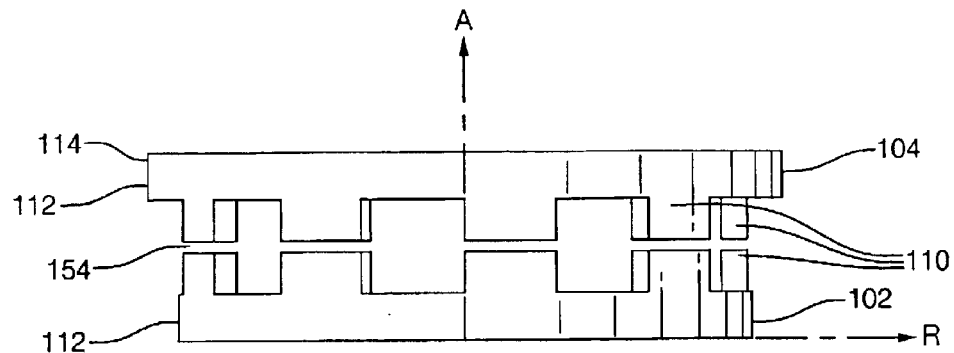
FIG. 3 is diagram depicting an upper toothed structure aligned with a lower toothed structure of the torque sensor in accordance with an exemplary embodiment.
Figure 4:
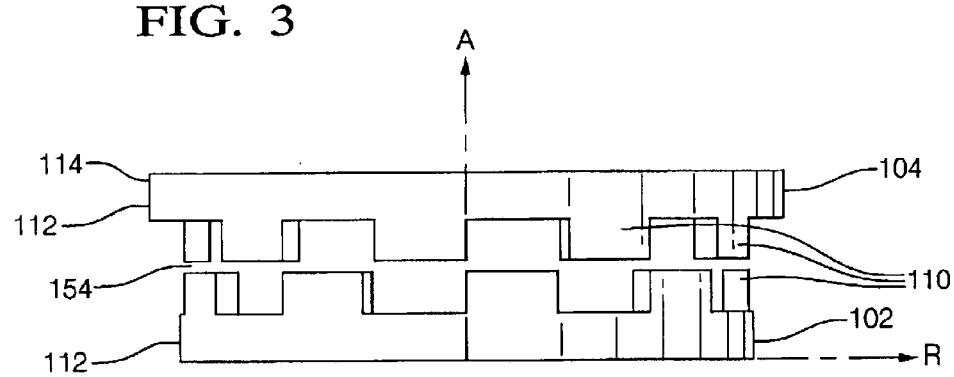
FIG. 4 is diagram depicting an upper toothed structure not aligned with a lower toothed structure of the torque sensor in accordance with an exemplary embodiment.

Referring now to FIGS. 3 and 4 as well, the UTS 102 and LTS 104 are each comprised of substantially similar annular rings of magnetic material (e.g., soft magnetic material, ferrite, and the like). The UTS 102 and LTS 104 each include an equal number of teeth shown generally as cut into the magnetic material about their circumference and projecting in an opposing radial direction and configured so that a selected finite air gap is maintained between the opposing teeth. In an exemplary embodiment, an air gap of one millimeter is employed between the teeth 110 of the UTS 102 and LTS 104.

The number of teeth 110 on both the UTS 102 and LTS 104 are same and also same in terms of geometry except at the back iron portion 112 of both, which is used to pass flux to the sleeve 106. In an exemplary embodiment nine teeth 110 are utilized for both the UTS 102 and the LTS 104. It will be apparent and made further evident from discussion herein that other numbers of teeth may readily be employed.

Continuing with FIGS. 2, 3, and 4, the LTS 104 also includes a flange or lip 114 projecting radially on the back iron portion 112 configured to maintain a selected magnetic air gap with an internal surface of the sleeve 106. In an exemplary embodiment, an air gap of 0.28 millimeter is employed. However, it will be readily appreciated that other air gaps may be employed based upon the particular configuration and arrangement of the torque sensor 28.

In an exemplary embodiment, the coil 108 is an assembly of two conductors wound around a bobbin, which surrounds only the toothed structure (projected portion not the back iron 112) of UTS 102 and LTS 104. The coil 108 is surrounded by a soft magnetic sleeve 106, which provides closed path to the magnetic flux produced by the current flowing through the coil 108. The sleeve 106 also includes and internal lip configured to maintain a selected magnetic air gap with a rear portion of UTS 102 In an exemplary embodiment, an air gap of 0.28 millimeter is employed. The coil 108 in conjunction with the UTS 102, LTS 104, and sleeve 106 forms the electromagnetic part of the torque sensor 28. In an exemplary embodiment, the sleeve 106, UTS 102, and LTS 104 are made of soft iron material.

Figure 5:
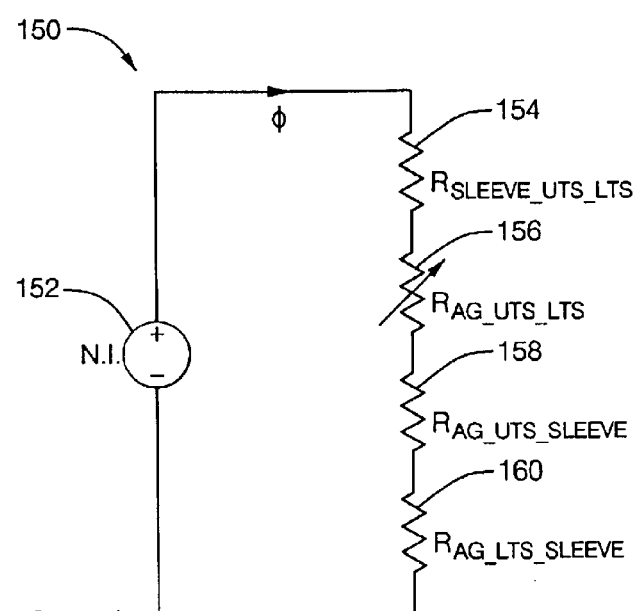
FIG. 5 is diagram depicting an equivalent circuit for the torque sensor in accordance with an exemplary embodiment.

Referring now to FIG. 5 as well, the inductance of the coil 108 varies due to the variation in the reluctance of the magnetic circuit of the torque sensor 28. FIG. 5 depicts an equivalent magnetic circuit 150 for the torque sensor 28. The equivalent magnetic circuit 150 includes the magnetomotive force denoted as NI and 152 with the core reluctance 154 and air gap reluctances 156, 158, and 160. The air gaps in the physical sensor and the reluctances associated therewith are:

(1). The air gap between the sleeve 106 and the back iron of the UTS 102 denoted ($\mathfrak{R}_{ag\_UTS\_sleeve}$) and 158 in the figure.

(2). The air gap between the sleeve 106 and the back iron of the LTS 104 denoted ($\mathfrak{R}_{ag\_LTS\_sleeve}$). and 160 in the figure.

(3). The air gap between the UTS 102 and the LTS 104 denoted ($\mathfrak{R}_{ag\_UTS\_LTS}$) and 156 in the figures.

Ideally, it will be readily understood that only the reluctance $\mathfrak{R}_{ag\_UTS\_LTS}$ 156 should vary as the UTS 102 and LTS 104 are rotated relative to one another as a torque is applied. In practice, because of tolerances, the parallel and angular offsets between the UTS 102 and LTS 104, and a temperature dependence of the properties of the soft magnetic material, the other reluctances may also vary. Therefore, an ideal design objective would be to make the reluctance variation, and thereby the inductance variation proportional to the reluctance variation in $\mathfrak{R}_{ag\_UTS\_LTS}$ 156 irrespective of any other variation.

To minimize the sensitivity of and effects from other reluctance sources, optimally, either the air gaps should be minimal or the areas should be maximal. A finite air gap is dictated by a non-contacting constraint, therefore, the area should be maximized to minimize the effects from $\mathfrak{R}_{ag\_UTS\_sleeve}$ 158 and $\mathfrak{R}_{ag\_LTS\_sleeve}$ 160. Increasing the length (axially) of the back iron 112 and sleeve 106 increases the area, making the inductance and thereby the magnetic circuit less sensitive to the variation in those particular reluctances. However, increases in the length of the back iron 112 and sleeve 106 increase the overall size and weight of the torque sensor 28. Therefore, a balance between the size of the sensor and the desired insensitivity to the reluctances may be appropriate.

In an exemplary embodiment, the air gap between UTS 102 and LTS 104 should be such that enough and reasonable variation in inductance between aligned and unaligned positions of the teeth 110. The aligned and unaligned positions of UTS 102 and LTS 104 are shown in FIGS. 3 and 4. Assuming the aligned position for the teeth 110 to be 0 degrees, the unaligned position becomes 20 degrees for a UTS 102 and LTS 104 exhibiting 9 teeth 110 each. The center or neutral position, therefore, occurs at 10 degrees, which is in between the aligned and unaligned positions. In an exemplary embodiment, the torque sensor 28 is limited by the travel of the torsion bar such that the relative movement between UTS 102 and LTS 104 may be ±8 degrees from the center/neutral position. Hence, it should be apparent, that the various air gaps, the geometry of the structure, and the material properties may all be selected to achieve a non-contacting torque sensor that achieves desirable characteristics.

In an exemplary embodiment, a torque sensor 28 with a one millimeter (mm) air gap between the teeth 110 of the UTS 102 and LTS 104 respectively, exhibited substantially linear response over the desired range. It will be further appreciated that the inductance and response is frequency dependent. As the frequency increases, the core loss influences the inductance to the extent that beyond 10 kHz, the inductance values may become saturated. Different configurations will, of course exhibit various frequency dependent characteristics. In an exemplary embodiment the inductance level is maintained to be sufficient such that the frequency of the oscillation of the oscillator circuit 120 (of which the inductance of the coil 108 is an integral part) is not too high (avoids core losses). Recall that the time period/frequency of the oscillation for the oscillator circuit 120 is proportional to the inductance of the coil 108 assuming the other circuit parameters remain unchanged. In an exemplary embodiment, the UTS 102 and LTS 104 and sleeve 106 are made of soft magnetic material having the properties of minimum core loss and high initial permeability (at low magnetomotive force). The frequency of the oscillation is selected such that the effect of core losses are minimal. In an exemplary embodiment a frequency of about 10 kHz is employed. Of course, other frequencies are possible, depending upon the selected values for R, L, and the acceptable core losses.

Figure 6:
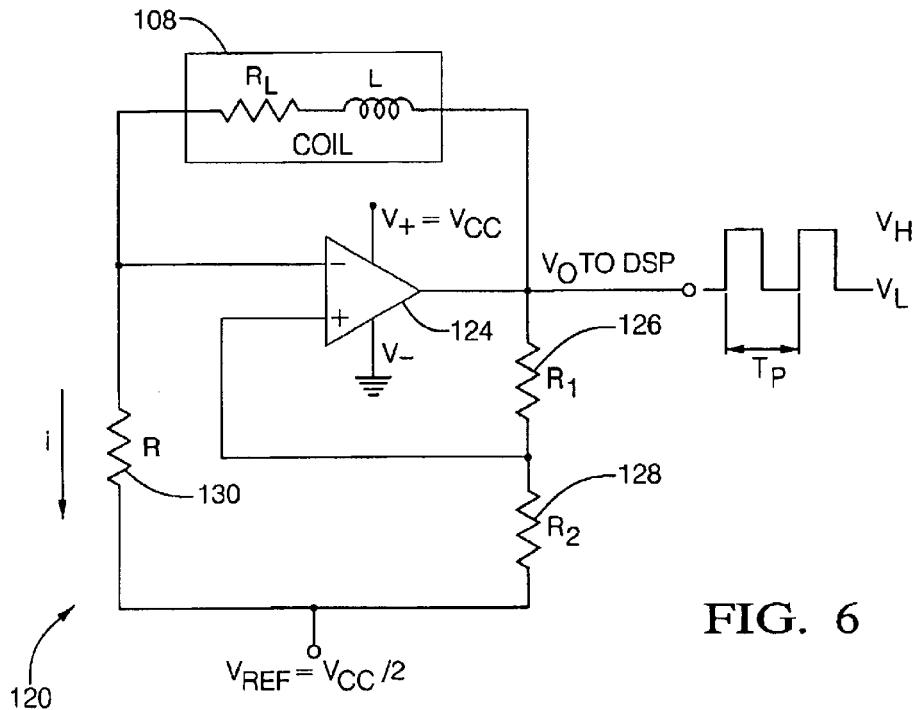
FIG. 6 depicts a schematic of an exemplary circuit for the oscillator circuit.

Torque Measurement and Determination:

Referring now to FIG. 6, a schematic of an exemplary circuit for the oscillator circuit 120 is depicted. The oscillator circuit 120 is configured to translate the inductance (L) information into time-period/frequency of the oscillation. More specifically, the oscillator circuit 120 converts the variation in inductance into a variation in time-period/frequency from which the torque may be readily ascertained. Ideally, the time-period ($T_p$) of oscillation is given by assuming the output of the oscillator circuit 120 varies between $V_L=0$, $V_H=V_{cc}$, and the ration $R_2/(R_1+R_2)=\frac{1}{2}$ yielding:

$$T_p = 2\left(\frac{L}{R+R_L}\right)\log_e\left[\frac{3+\frac{R_L}{R}}{1-\frac{R_L}{R}}\right] = 2\frac{L}{R}\left(\frac{1}{1+\frac{R_L}{R}}\right)\log_e\left(\frac{3+\frac{R_L}{R}}{1-\frac{R_L}{R}}\right). \quad (1)$$

Equation (1) shows that as the inductance L varies with applied torque, the period $T_p$ also varies. Hence, by measuring the period $T_p$, the torque information from the torque sensor 28 may be extracted. A DSP algorithm may be employed for this purpose as will be discussed at a later point herein.

In an exemplary embodiment, the oscillator circuit 120 is configured to accommodate operation from a single voltage supply operation as shown in FIG. 6. Turning to the figure, in an exemplary embodiment, the oscillator circuit 120 comprises an operational amplifier 124 with the inductance L and resistance $R_L$ of the coil 108 in the feedback. Resistance R also denoted 130 provides input from a reference voltage source denoted $V_{REF}$, selected in this instance to be half of the supply voltage denoted $V_{CC}$. Moreover, resistors $R_1$ and $R_2$ also denoted 126 and 128 respectively, operate to facilitate providing hysteresis. One skilled in the art would appreciate and understand the operation of the oscillator circuit 120, therefore, further description of the operation is omitted.

Effect of Temperature and Its Compensation:

Theoretically, the inductance (L) of the coil 108 varies with temperature though it is minimized from magnetic design of the core. The permeability and resistivity of the magnetic core material change with temperature, which in turn influences the inductance variation. Finally, the winding resistance ($R_L$) of the coil 108 varies with temperature. Therefore, the effect of the variation of $R_L$ and L with temperature on $T_p$ is preferably compensated. It will be appreciated that Equation (1) may be simplified in by ensuring that the value for R is much larger than $R_L$ yielding:

$$T_p \approx 2\left(\frac{L}{R}\right)\log_e 3 \quad \frac{R_L}{R} \ll 1. \quad (2)$$

$$T_p \approx kL \quad (2a)$$

Therefore, if the proportionality constant k of Equation (2a) may be kept constant over the whole operating temperature range, temperature insensitivity of the oscillator circuit 120 may readily be achieved if the inductance variation is maintained within acceptable limits. Therefore, by using a precision resistor for resistor R 130, where R>>$R_L$. Advantageously, this approach also makes the oscillator circuit 120 substantially independent of the temperature as the resistors $R_1$ 126 and $R_2$ 128 are used as voltage divider, and thus it can be assumed that the resistance ratio of the voltage divider remains substantially the same with temperature variation. Therefore, only component tolerance and variation have effect, which may be readily addressed with precision resistors and components. Assuming a change in the resistance of the coil 108 $R_L$ as $\Delta R_L$, the change in time period $\Delta T_p$ can be expressed as:

$$\Delta T_p = \frac{2L}{R}\left(\frac{4}{3} - \log_e 3\right) \cdot \frac{\Delta R_L}{R} \Rightarrow R = \sqrt{2L \cdot \frac{\Delta R_L}{\Delta T_p} \cdot \left(\frac{4}{3} - \log_e 3\right)}. \quad (3)$$

Equation (3) may be therefore, be employed to design resistance R 130 for a given bound on $\Delta T_p$. The value of R 130 for a given maximum inductance $L_{MAX}$ of the coil 108 for given bound on $\Delta T$ is the appropriate design. In other words, based upon an expected possible range of inductance L for the coil 108, a selected value for R will result in a bounded range for $T_p$. Therefore, resistor R may readily be selected to achieve a desired range of frequencies/period $T_p$. In an exemplary embodiment for a inductance L of with a range from about 1.6 milliHenries to about 1.8 milliHenries, resistance R 130 may be selected to be about 40 ohms to achieve a frequency in desired range. Advantageously, the drift in supply voltage to the operation amplifier 124 does not change the period $T_p$, but the amplitude of the oscillation.

Figure 7:
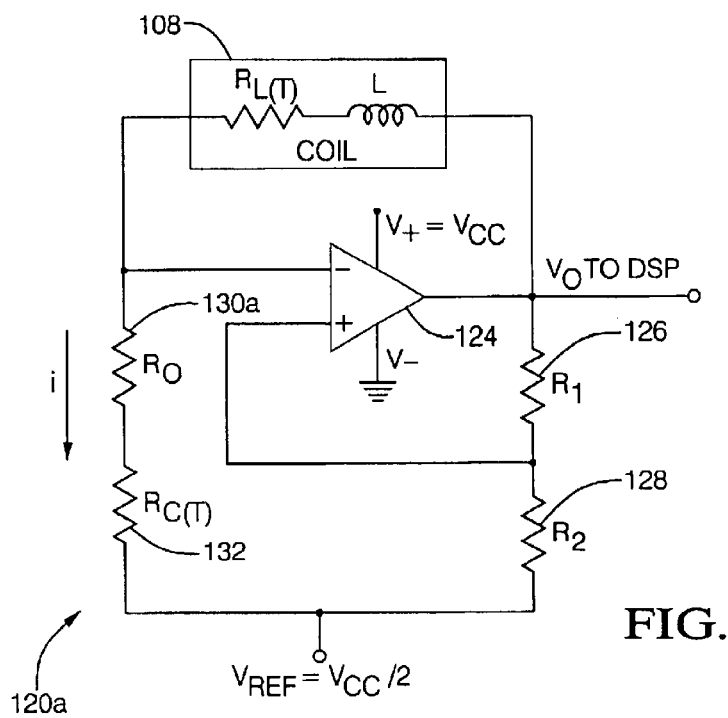
FIG. 7 depicts a schematic of an exemplary circuit for the oscillator circuit with temperature compensation.

Turning to FIG. 7, in yet another exemplary embodiment an oscillator circuit 120a is depicted where a temperature-compensating resistor $R_c$ also denoted 132 is incorporated to nullify the effect of variation in L and/or $R_L$ with temperature on time-period ($T_p$) of the oscillation.

It will be appreciated that in an exemplary embodiment the resistors e.g., 126, 128, 130, 132 maybe the precision resistors, which do not vary more than 0.1% over the whole temperature range. The inductance to time-period (L-$T_p$) expression from Equation (1) may be rewritten as a function of temperature as:

$$T_p = 2\left(\frac{L(T)}{R + R_L(T)}\right)\log_e\left[\frac{3 + \frac{R_L(T)}{R}}{1 - \frac{R_L(T)}{R}}\right] \quad (4)$$

where $R_L(T) = R_{La}(1 + \alpha_{R_L}(T-T_a))$. (4a)

and: $R_{La}$ denotes the winding resistance at ambient temperature $T_a$ $\alpha_{RL}$ is the temperature coefficient.

The nature of variation of L and $R_L$ with temperature is similar. Careful investigation shows that if R can be made to exhibit similar properties to L and $R_L$ with temperature, then, in the oscillator circuit 120 (120a) operation it has the opposite effect on Tp. Therefore, using R 130, it will be appreciated that the variations in Tp with temperature may be balanced. The temperature dependence of L and $R_L$ may be determined experimentally for initial design of the compensating resistor $R_c$, 132 or analytically.

Considering that the sum of $R_o$ 130 and $R_c$ 132 establishes the operating frequency of oscillation, while at ambient temperature, the total resistance should be equal to the desired value for R 130 (from above).

It will be evident that $R_L$ would ideally be zero to make $T_p$ insensitive to temperature assuming R and L do not vary with temperature. As is well known, in practice, both L and $R_L$ exhibit variation with temperature. As disclosed hereinbefore, the temperature variation in L (the inductance of coil 108) may be accounted for and compensated to within selected constraints by magnetic design specification. Therefore, the compensation disclosed herein may address only the variation with temperature in $R_L$, the variation in L or both to achieve temperature insensitivity for the torque sensor 28.

Continuing with FIG. 7, the compensating resistor $R_c$ 132, may be placed in series with $R_o$, also denoted 130a, which exhibits similar temperature properties as the winding resistance, in this instance copper wire used in the coil 108. The relation in Equation (4) may be rewritten illustrating the temperature dependency and considering resistor $R_c$ 132 as:

$$T_p = 2\left(\frac{L(1 + \alpha_L(T - T_a))}{R_o + R_{ca}(1 + \alpha_{R_c}(T - T_a)) + R_{La}(1 + \alpha_{R_L}(T - T_a))}\right) \quad (5)$$

$$\log_e\left[\frac{3 + \frac{R_{La}(1 + \alpha_{R_L}(T - T_a))}{R_o + R_{ca}(1 + \alpha_{R_c}(T - T_a))}}{1 - \frac{R_{La}(1 + \alpha_{R_L}(T - T_a))}{R_o + R_{ca}(1 + \alpha_{R_c}(T - T_a))}}\right]$$

where $R_{ca}$ 132 and $R_{La}$ represent the nominal values for these resistances respectively at ambient temperature $T_a$ and $\alpha_{RL}$ and $\alpha_{RC}$ are the temperature coefficients of resistance for winding and compensating resistance respectively.

Observation of Equation (5) indicates the following parametric relationships:

$T\uparrow R_L\uparrow L\uparrow \Rightarrow T_p\uparrow$ $T\downarrow R_L\downarrow L\downarrow \Rightarrow T_p\downarrow$ $T\uparrow (R_o+R_c(T))\uparrow \Rightarrow T_p\downarrow$ $T\downarrow (R_o+R_c(T))\downarrow \Rightarrow T_p\uparrow$ where T is temperature, $R_L$ is the resistance of the coil, L is the inductance, $R_o$ is a resistor in the oscillator circuit 120a, $R_c$ is a temperature compensation resistor in the oscillator circuit 120a, $T_p$ is the period of oscillation.

It will now be appreciated from Equation (5) that one may readily design $R_c$ 132 to make $T_p$ independent of temperature T. Mathematically, taking the derivative of $T_p$ with respect to T and equating it to zero, the value of $R_{ca}$ ($R_c$132 at ambient) is readily computed. Hence, the final expression to solved becomes:

$$\frac{dT_p(T)}{dT} = 0 \quad (6)$$

$$= \alpha_L \log_e\left[\frac{3 + \frac{R_{La}(1 + \alpha_{R_L}(T - T_a))}{R_o + R_{ca}(1 + \alpha_{R_c}(T - T_a))}}{1 - \frac{R_{La}(1 + \alpha_{R_L}(T - T_a))}{R_o + R_{ca}(1 + \alpha_{R_c}(T - T_a))}}\right] - \left(\frac{(1 + \alpha_L(T - T_a))(R_{ca}\alpha_{R_c} + R_{La}\alpha_{R_L})\log_e\frac{3 + \frac{R_{La}(1 + \alpha_{R_L}(T - T_a))}{R_o + R_{ca}(1 + \alpha_{R_c}(T - T_a))}}{1 - \frac{R_{La}(1 + \alpha_{R_L}(T - T_a))}{R_o + R_{ca}(1 + \alpha_{R_c}(T - T_a))}}}{R_o + R_{ca}(1 + \alpha_{R_c}(T - T_a)) + R_{La}(1 + \alpha_{R_L}(T - T_a))}\right) +$$

-continued $$\left[\left(\frac{R_{La}\alpha_{R_L}}{R_o+R_{ca}(1+\alpha_{R_c}(T-T_a))}-\frac{R_{La}(1+\alpha_{R_L}(T-T_a))R_{ca}\alpha_{R_c}}{(R_o+R_{ca}(1+\alpha_{R_c}(T-T_a)))^2}\right).\right.$$
$$\left.\left(1+\frac{3+\frac{R_{La}(1+\alpha_{R_L}(T-T_a))}{R_o+R_{ca}(1+\alpha_{R_c}(T-T_a))}}{1-\frac{R_{La}(1+\alpha_{R_L}(T-T_a))}{R_o+R_{ca}(1+\alpha_{R_c}(T-T_a))}}\right)\cdot\frac{(1+\alpha_L(T-T_a))}{3+\frac{R_{La}(1+\alpha_{R_L}(T-T_a))}{R_o+R_{ca}(1+\alpha_{R_c}(T-T_a))}}\right]$$

To extract the value of $R_{ca}$, a numerical solution to Equation (6) is desired. Depending on temperature, it will be appreciated that a range of values for $R_c$ 132, which satisfy Equation (6) may be ascertained. It will also be appreciated, that the lower the nominal value of $R_L$, the smaller the potential range of values for $R_c$ 132 over the temperature range. Therefore, because the resistance $R_L$ should be kept as small as possible, a value for resistance $R_c$ 132 may readily be implemented employing track resistance of a printed circuit board so that the compensation resistance $R_c$ 132 exhibits similar properties to the copper winding. In general, the ratio $R/R_L$ greater than 10 has negligible effect on period ($T_p$) due to the change in $R_L$ over the operating temperature range.

Implementing the compensation resistance $R_c$ 132 and incorporating the magnetic design for steady inductance L over the temperature range, the torque sensor 28 may readily provide superior characteristics including but not limited to, simple construction, very low-cost compared to the existing technologies and art, and a minimum of interface electronics.

In yet another embodiment, it will readily be appreciated that direct temperature compensation is also possible. Temperature can be measured with temperature sensor 23, and the torque signal directly compensated with appropriate scaling.

Figure 8:
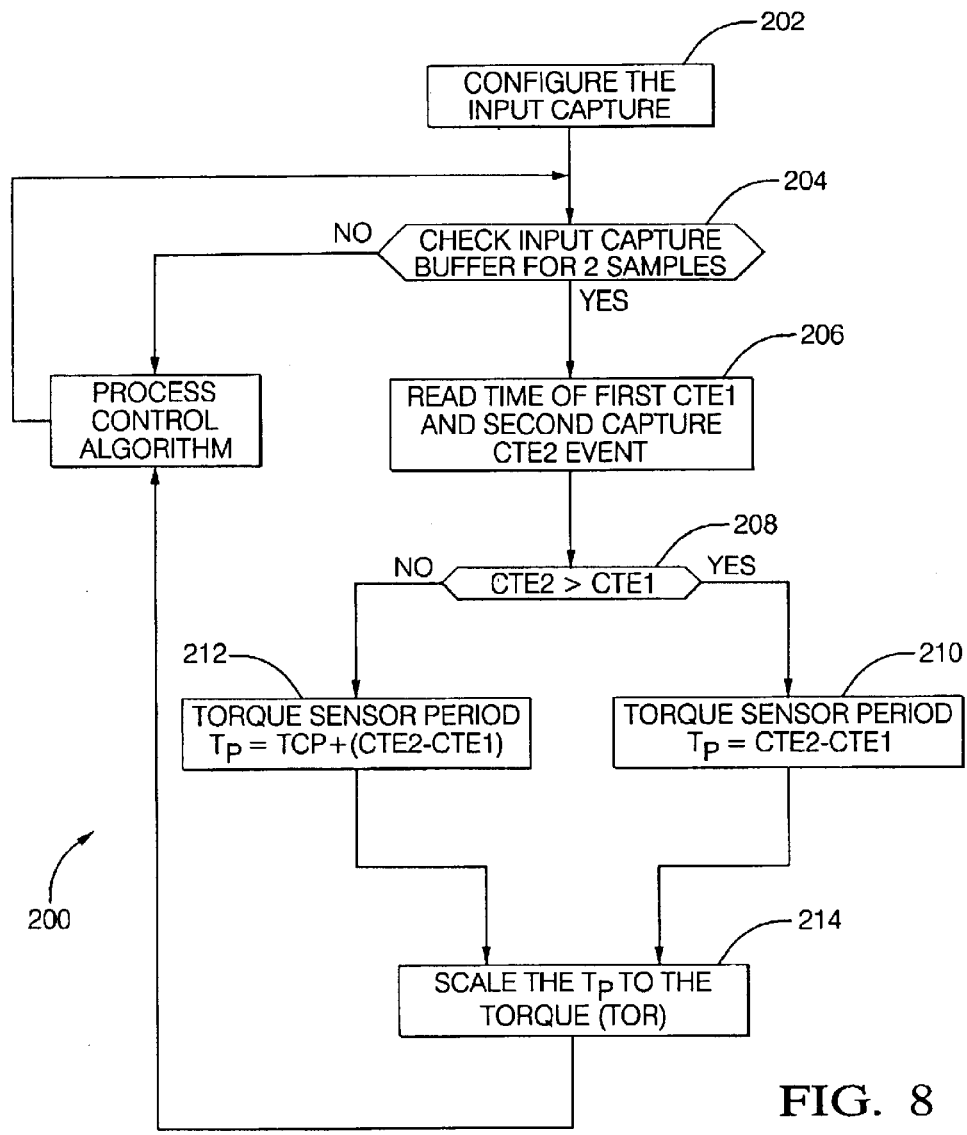
FIG. 8 depicts a flow chart of an exemplary algorithm for the capture of an oscillation period and determination of a torque.
Figure 9:
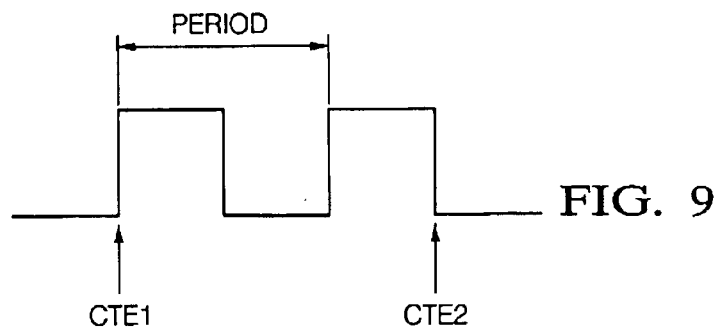
FIG. 9 depicts an illustration of the period capture, and the parameters associated with determination of an oscillation frequency.

DSP Methodology for Time Period Measurement:

FIG. 8 depicts a flow chart of an exemplary algorithm 200 for the capture of the period and determination of the torque. FIG. 9 depicts an illustration of period capture, and the parameters associated with determination of the oscillation frequency and ultimately the torque sensed. In an exemplary embodiment, the output of the oscillator circuit 120 (120a) (FIGS. 6 and 7 respectively) is connected to an input capture circuit or function of a DSP (or other like processor). Moreover, in an exemplary embodiment, the algorithm 200 may by implemented as a recursive loop for processing the torque signal(s) 18 and determination of the oscillation period as may be implemented in software, firmware, dedicated field programmable gate array, and the like, as well as combinations including at least one of the foregoing.

A capture clock is employed to facilitate determination of the oscillation period $T_p$. The maximum time of the capture clock hereinafter denoted (TCP) is set to a selected maximum period. In an exemplary embodiment, the capture clock (TCP) is set to be more than the maximum expected period $T_p$ of the input capture signal from the oscillator circuit 120 (120a) (FIGS. 6 and 7 respectively). The selected frequency band is generated from the inductance profile of the torque sensor 28 as discussed above. Advantageously, this also means that a failure of the torque sensor 28, or inoperative torque sensor 28 will result in generation of a frequency, which is outside the selected band indicating a fault. Similarly, improper operation of the oscillator circuit 120, 120a will also result in generation of a frequency, which is outside the selected band. If the computed period $T_p$ is outside the selected band including a selected tolerance, an invalid sensed torque is flagged. This flag may be transmitted to the diagnostics portion of the algorithm 200 and/or overall processing for the steering system 40 (FIG. 1).

Continuing with FIGS. 8 and 9, the input capture is configured to capture a transitioning edge of the input frequency signal ($V_o$ of the oscillator circuit 120, 120a) as depicted at process block 202. The data from the input capture is processed after two consecutive captures as indicated by decision block 204 and an associated loop. If two consecutive captures are acquired, at process block 206 the times associated with a first capture denoted in the figure as CTE1 and second capture denoted in the figure CTE2 respectively, are determined. The time difference between the two respective captures is computed at process blocks 210 (or 212) and yields the period $T_p$ for the input frequency from the oscillator circuit 120, (120a). Decision block 208 selects an appropriate computation at process blocks 210 and 212 respectively to address numerical computation issues. It will be further appreciated that while an exemplary embodiment discusses two consecutive captures for measurement of timing it should be evident that other configurations of the process are possible. For example, any two successive transitions would facilitate computation of half of the period, and the like. Finally, at process block 214 the period $T_p$ scaled to calculate the torque as measured. As discussed above, the period is proportional to the time constant of the coil 108 and hence the displacement of the UTS 102 and LTS 104 (FIG. 2). Once again, the torque may be directly obtained from the period $T_p$.

The disclosed invention can be embodied in the form of computer or controller implemented processes and apparatuses for practicing those processes. The present invention can also be embodied in the form of computer program code containing instructions embodied in tangible media 13, such as floppy diskettes, CD-ROMs, hard drives, or any other computer-readable storage medium, wherein, when the computer program code is loaded into and executed by a computer or controller, the computer becomes an apparatus for practicing the invention. The present invention may also be embodied in the form of computer program code as a data signal 15, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

It will be appreciated that the use of first and second or other similar nomenclature for denoting similar items is not intended to specify or imply any particular order unless otherwise stated.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of detecting a sensed parameter for a motor control system comprising:

receiving a sensor signal, said sensor signal exhibiting a frequency responsive to an inductance and resistance of a non-contacting variable reluctance rotational displacement sensor, wherein said inductance and resistance is indicative of a displacement of said sensor and responsive to said sensed parameter;

capturing a first transition of said sensor signal and a time associated therewith;

capturing a second transition of said sensor signal and a time associated therewith;

calculating a period for said sensor signal; and computing a value for said sensed parameter, said value responsive to said period.

2. The method of claim 1 wherein said rotational displacement is responsive to the twist of a torsion bar.

3. The method of claim 1 wherein said sensed parameter is a torque, and said inductance and resistance is responsive to said torque.

4. The method of claim 1 wherein said frequency is temperature compensated.

5. The method of claim 4 wherein said temperature compensation comprises computing a selected resistance for an oscillator circuit to compensate for a temperature variation of said sensor.

6. The method of claim 1 further including receiving said sensor signal from an oscillator circuit.

7. The method of claim 1 further including a receiving a temperature signal responsive to a temperature sensor for providing temperature compensation to said oscillator circuit.

8. A system for measuring a sensor parameter for a motor control system in a vehicle steering system comprising:

a parameter sensor comprising a non-contacting variable reluctance rotational displacement sensor, generating and transmitting a sensor signal indicative of a sensed parameter;

a controller operatively coupled to said parameter sensor;

said controller executing method for:

receiving a sensor signal, said sensor signal exhibiting a frequency responsive to an inductance and resistance of said parameter sensor, wherein said inductance and resistance is indicative of a displacement of said sensor and responsive to said sensed parameter;

capturing a first transition of said sensor signal and a time associated therewith;

capturing a second transition of said sensor signal and a time associated therewith;

calculating a period for said sensor signal; and computing a value for said sensed parameter, said value responsive to said period.

9. The system of claim 8 wherein said rotational displacement is responsive to the twist of a torsion bar.

10. The system of claim 8 wherein said sensed parameter is a torque, and said inductance and resistance is responsive to said torque.

11. The system of claim 8 wherein said frequency is temperature compensated.

12. The system of claim 11 wherein said temperature compensation comprises computing a selected resistance for an oscillator circuit to compensate for a temperature variation of said sensor.

13. The system of claim 8 further including an oscillator circuit transmitting said sensor signal.

14. The system of claim 8 further including a temperature sensor transmitting a temperature signal for providing temperature compensation to said oscillator circuit.

15. A steering system with a parameter sensor comprising:

a steerable wheel coupled to a motor;

a parameter sensor generating and transmitting a sensor signal indicative of a sensed parameter;

a controller operatively coupled to said motor and said parameter sensor;

said controller generating command to direct said motor; and said parameter sensor comprising;

an annular sleeve;

a coil coaxially aligned within said sleeve;

a first ring shaped toothed structure in magnetic communication with said sleeve, coaxially aligned and configured to rotate relative to said sleeve, said first ring shaped toothed structure including a first plurality of axially directed teeth arranged substantially equidistant about a circumference of said first ring shaped toothed structure on a front portion thereof;

a second ring shaped toothed structure in magnetic communication with said first ring shaped toothed structure and said sleeve, said second ring shaped toothed structure coaxially aligned and configured to rotate relative to said first ring shaped toothed structure and said sleeve and including a second plurality of axially directed teeth configured substantially the same as said first plurality of axially directed teeth and oriented adjacent to said first plurality of axially directed teeth on a rear portion of said second ring shaped toothed structure;

wherein said sleeve includes an internal flange configured to maintain a selected magnetic air gap with a rear portion of first ring shaped tooth structure; and wherein said coil generates a signal responsive to a differential rotational displacement between said first ring shaped toothed structure and said second ring shaped toothed structure.

16. The steering system of claim 15 wherein said coil substantially surrounds said first plurality of axially directed teeth and said second plurality of axially directed teeth.

17. The steering system of claim 15 wherein said second ring shaped toothed structure includes a flange about its circumference configured to maintain a selected magnetic air gap with an internal surface of said sleeve.

18. The steering system of claim 15 further including an oscillator circuit operatively connected with said coil, said oscillator circuit generating a frequency of oscillation responsive to said differential rotational displacement.

19. The steering system of claim 15 wherein said sleeve, first ring shaped toothed structure, and second ring shaped toothed structure are fabricated from ferrite.

20. The steering system of claim 15 wherein said differential rotation displacement is responsive to the twist of a torsion bar.

21. The steering system of claim 15 wherein said sensor is responsive to a torque.

22. A system for measuring a sensor parameter for a motor control system in a vehicle steering system comprising:

a means for receiving a sensor signal, said sensor signal exhibiting a frequency responsive to an inductance and resistance of a non-contacting variable reluctance rotational displacement sensor, wherein said inductance and resistance is indicative of a displacement of said sensor and responsive to said sensed parameter;

a means for capturing a first transition of said sensor signal and a time associated therewith;

a means for capturing a second transition of said sensor signal and a time associated therewith;

a means for calculating a period for said sensor signal; and a means for computing a value for said sensed parameter, said value responsive to said period.

23. A storage medium encoded with a machine-readable computer program code, said storage medium including instructions for causing controller to implement a method for detecting a sensed parameter for a motor control system comprising;

receiving a sensor signal, said sensor signal exhibiting a frequency responsive to an inductance and resistance of a non-contacting variable reluctance rotational displacement sensor, wherein said inductance and resistance is indicative of a displacement of said sensor and responsive to said sensed parameter;

capturing a first transition of said sensor signal and a time associated therewith;

capturing a second transition of said sensor signal and a time associated therewith;

calculating a period for said sensor signal; and computing a value for said sensed parameter, said value responsive to said period.

24. A computer data signal, said computer data signal comprising code configured to cause a controller to implement a method detecting a sensed parameter for a motor control system comprising:

receiving a sensor signal, said sensor signal exhibiting a frequency responsive to an inductance and resistance of a non-contacting variable reluctance rotational displacement sensor, wherein said inductance and resistance is indicative of a displacement of said sensor and responsive to said sensed parameter;

capturing a first transition of said sensor signal and a time associated therewith;

capturing a second transition of said sensor signal and a time associated therewith;

calculating a period for said sensor signal; and computing a value for said sensed parameter, said value responsive to said period.

25. The method of claim 4 wherein said frequency is temperature compensated by providing compensation for at least one of said inductance and said resistance of said sensor.

26. The system of claim 11 wherein said frequency is temperature compensated with compensation for at least one of said inductance and said resistance of said sensor.

* * * * *